(12) United States Patent
Betts et al.

(10) Patent No.: US 7,948,828 B2
(45) Date of Patent: May 24, 2011

(54) FLASHER SONAR DEVICE WITH LIGHT GUIDE

(75) Inventors: David A. Betts, Eufaula, AL (US);
David E. Malphurs, Eufaula, AL (US);
David McLeod, Lutz, FL (US)

(73) Assignee: Johnson Outdoors Inc., Racine, WI (US)

( * ) Notice: Subject to any disclaimer, the term of this patent is extended or adjusted under 35 U.S.C. 154(b) by 273 days.

(21) Appl. No.: 12/291,280

(22) Filed: Nov. 7, 2008

(65) Prior Publication Data
US 2009/0141588 A1 Jun. 4, 2009

Related U.S. Application Data

(60) Provisional application No. 61/004,832, filed on Nov. 30, 2007.

(51) Int. Cl.
*G01S 15/96* (2006.01)
(52) U.S. Cl. .................................................. 367/109
(58) Field of Classification Search .................. 367/109
See application file for complete search history.

(56) References Cited

U.S. PATENT DOCUMENTS

| | | | |
|---|---|---|---|
| 2,071,284 A * | 2/1937 | Hyland | 116/244 |
| 3,713,143 A * | 1/1973 | Blitz | 367/109 |
| 3,964,012 A | 6/1976 | Yamamoto et al. | |
| 4,644,512 A | 2/1987 | Grilk | |
| 4,829,492 A | 5/1989 | Choi et al. | |
| 4,829,493 A | 5/1989 | Bailey | |
| 4,873,676 A | 10/1989 | Bailey et al. | |
| 5,184,330 A | 2/1993 | Adams et al. | |
| 5,459,479 A | 10/1995 | Cummings | |
| 5,594,707 A | 1/1997 | Goto et al. | |
| 5,973,997 A | 10/1999 | Yamamoto et al. | |
| 5,999,490 A | 12/1999 | Shimauchi et al. | |
| 6,009,044 A | 12/1999 | Goto et al. | |
| 6,650,595 B2 | 11/2003 | Asakura | |
| 6,768,701 B1 | 7/2004 | Cummings et al. | |
| 7,057,972 B1 | 6/2006 | Noda et al. | |
| 7,495,997 B1 | 2/2009 | Cummings | |
| 2009/0141588 A1* | 6/2009 | Betts et al. | 367/109 |
| 2009/0141589 A1* | 6/2009 | Arney et al. | 367/109 |
| 2009/0141590 A1* | 6/2009 | Betts et al. | 367/111 |

OTHER PUBLICATIONS

Raymarine, Apelco FLX 400 Digital Color Flasher, Instruction Manual, May 9, 2003, pp. 1 and 7.
Humminbird Legend ID 40 Flasher, Internet Image, http://www.jbeezwatercraft.com/store/images/legendid40.jpg, visited Feb. 8, 2008.
Lowrance LCF 1440, Internet Image, http://images.outdoorinteractive.net/mgen/460138_d.jpg, visited Oct. 7, 2008.
Lowrance m68, Internet Image, http://i19.ebayimg.com/05/i/000/d7/dd/24c2_1.JPG, visited Feb. 8, 2008.

* cited by examiner

*Primary Examiner* — Dan Pihulic
(74) *Attorney, Agent, or Firm* — Reinhart Boerner Van Deuren P.C.

(57) ABSTRACT

A sonar device includes a light source, a rotatable element, a motor for rotating the rotatable element, and a display. A light guide mounted on the rotatable element has an inlet end aligned with the light source and an outlet end aligned with the display. Light emitted from the light source enters the inlet end of the light guide, is directed from the inlet end to the outlet end in a beam, and is emitted out the outlet end of the light guide.

20 Claims, 13 Drawing Sheets

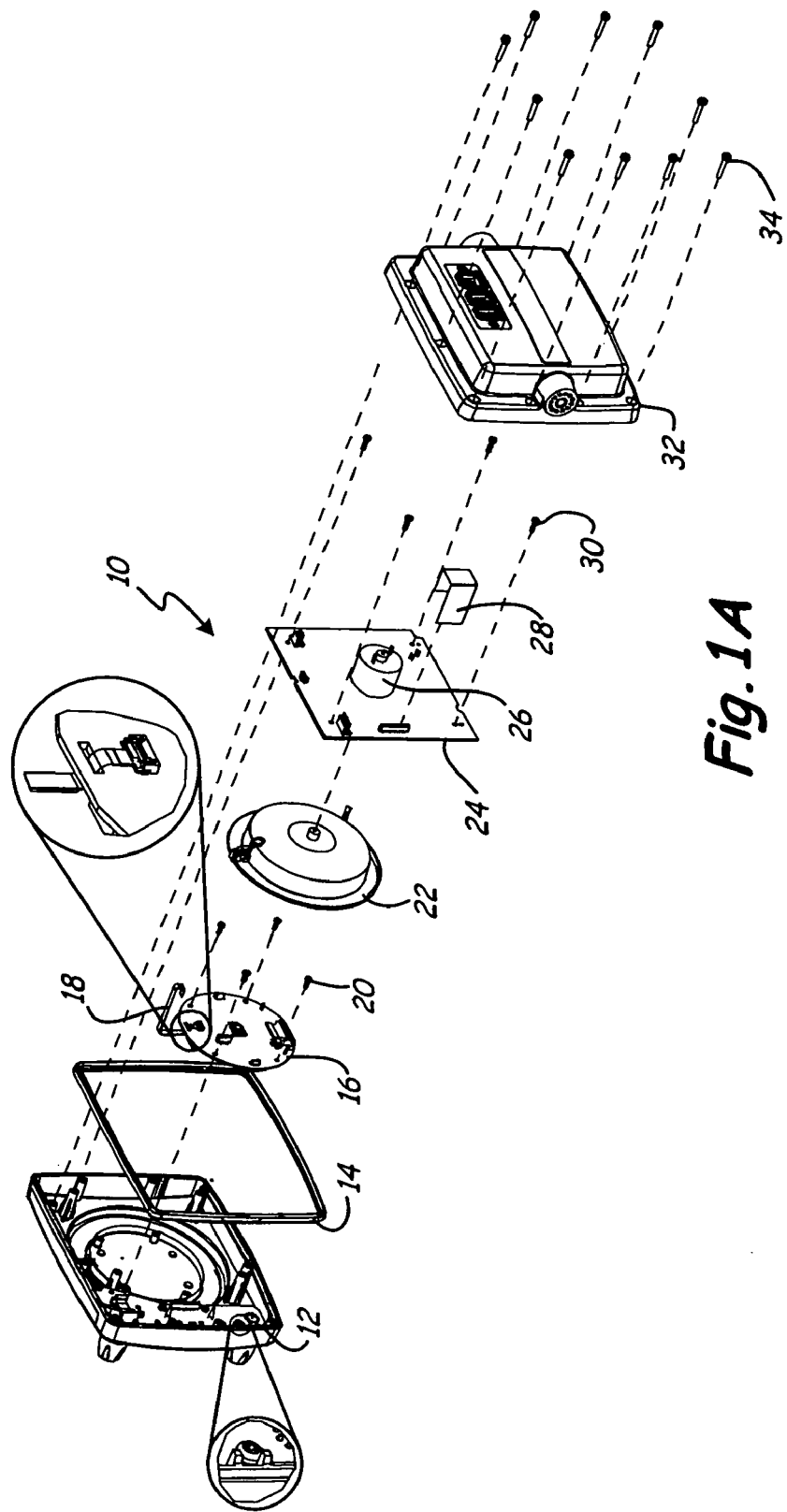

FLASHER SONAR DEVICE WITH LIGHT GUIDE

CROSS REFERENCE TO RELATED APPLICATION(S)

This application claims the benefit of Provisional Application No. 61/004,832 filed Nov. 30, 2007 for "Flasher Fish Finder" by C. Arney, C. Bennett, D. Betts, S. Harrington, and D. Malphurs. This application is also related to co-pending, commonly assigned U.S. patent application entitled "Flasher Sonar Device with LCD Annotations" having Ser. No. 12/291,283, filed on even date herewith. This application is also related to co-pending, commonly assigned U.S. patent application entitled "Flasher Sonar Device with Interleaved Zoom" having Ser. No. 12/291,289, filed on even date herewith.

INCORPORATION BY REFERENCE

The aforementioned Provisional Application No. 61/004,832 is hereby incorporated by reference in its entirety.

BACKGROUND

The present invention relates to sonar devices, and in particular, to a flasher type sonar device.

Sonar systems are widely used by anglers in determining the depth of water in a lake or river, as well as the presence and depth of fish. Sonar systems use a transducer to generate a sonar pulse that is directed down through the water. The transducer receives a sonar echo return from the bottom, as well as sonar returns from fish or other objects in the water column located within the sonar beam. The time between the transmission of the sonar pulse and the reception of the sonar return can be used as a measure of the distance from the transducer to the bottom, or the distance of the transducer to the fish. Currently popular fish finders take two different forms. In one form, the fish finder has a liquid crystal display that presents a scrolling picture of the bottom, suspended fish, and submerged structure such as weeds, trees, and the like.

The other form of fish finder (referred to as a flasher) has a circular ring lens with an adjacent scale indicating distance below the transducer. The location of the transducer appears at the top of the ring at the 12 o'clock or 0° position. A motor driven disc or spinner carrying multiple colored light sources rotates behind the lens. As the disc rotates, light is emitted by the light sources at different positions around the ring to represent sonar returns from suspended fish or other objects, as well as from the bottom. The color of the light flashes represents the signal intensity of the sonar return, and the angular position of the flash represents a depth of the fish, object, or bottom from the transducer. Examples of flasher type fish finders are shown in Frederickson et al. U.S. Pat. No. 3,952,279; Yamamoto et al. U.S. Pat. No. 3,964,012; Grilk U.S. Pat. No. 4,644,512; Yamamoto et al. U.S. Pat. No. 5,973,997; Cummings et al. U.S. Pat. No. 6,768,701; Asakura U.S. Pat. No. 6,650,595; and Noda et al. U.S. Pat. No. 7,057,972.

SUMMARY

According to the present invention, a sonar device includes a light source, a rotatable element, a motor for rotating the rotatable element, and a display. A light guide mounted on the rotatable element has an inlet end aligned with the light source and an outlet end aligned with the display. Light emitted from the light source enters the inlet end of the light guide, is directed from the inlet end to the outlet end in a beam, and is emitted out the outlet end of the light guide.

BRIEF DESCRIPTION OF THE DRAWINGS

FIG. 1A is an exploded view of one embodiment of the flasher sonar device of the present invention.

DETAILED DESCRIPTION

Figure 1B:
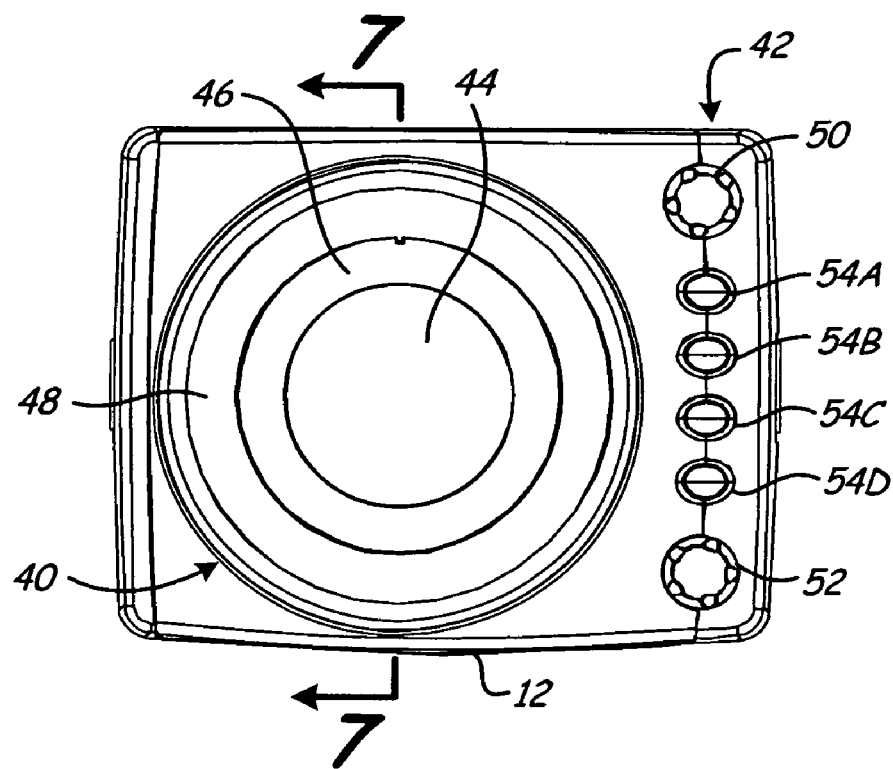
FIG. 1B is a front view of one embodiment of the flasher sonar device.

FIG. 1A shows an exploded view of one embodiment of flasher fish finder 10, which includes front housing assembly 12, gasket 14, liquid crystal display (LCD) module 16, flex connector 18, LCD module mounting screws 20, spinner assembly 22, main printed circuit board assembly 24, motor 26, flex connector 28, main PCB mounting screws 30, rear housing assembly 32, and main housing screws 34.

On its front face (shown in FIG. 1B), front housing assembly 12 includes flasher display 40 and user inputs 42. Flasher display 40 includes LCD display lens 44, lens overlay ring 46 (which surrounds LCD display lens 44), and flasher ring lens 48 (which surrounds overlay ring 46). In the embodiment shown in FIG. 1B, user inputs 42 include encoder knob 50, selector knob 52, and keys 54A-54D. In other embodiments, two additional keys 54E and 54F are also included (see FIGS. 9A-11D).

LCD module 16 is positioned behind LCD display lens 44 and provides both alphanumeric information and icons. LCD module 16 cooperates with graduation markers on overlay ring 46 to provide dynamic annotated range scales for flasher display 40. Depending upon the range selected using selection knob 52, LCD module 16 provides the numerical values corresponding to the graduations, so that the user sees the appropriate numerical depth value for the selected range.

LCD module 16 also displays a digital depth value and provides visual feedback for settings such as sensitivity and noise. User interface icons and words are displayed by LCD module 16 to allow the user to quickly determine the current settings and operating modes of fish finder 10.

The flasher light signals that appear through flasher ring lens 48 are produced by spinner assembly 22, which is mounted behind LCD module 16. Flasher ring lens 48 can be any circular or annular window, and is typically a transparent plastic ring with annular, concentric grooves. Spinner assembly 22 is a cup shaped unit that is mounted on the output shaft of motor 26. Spinner assembly 22 carries a rotating fiber optic light pipe that has an inlet end at the center of spinner assembly 22, and an outlet end at the outer periphery of spinner assembly 22. Light is provided to the inlet end of the fiber optic light pipe by a multicolor LED source mounted on the back side of LCD module 16.

Spinner assembly 22 also includes an interrupt arm (synchronization interrupter 154 shown in FIGS. 5A and 5B) that is used to synchronize flasher operation. Each time the interrupt arm passes through a detector carried on main circuit board 24, a synchronization pulse is generated which is used to calculate spinner speed and top dead center position.

Main circuit board assembly 24 carries electronic circuitry that processes inputs from user interface, control operations of the sonar transducer (not shown), processes sonar return signals, and controls operation of LCD module 16 and spinner assembly 22. Flex connector 18 connects LCD module 16 to main circuit board 24. Flex connector 28 connects the user inputs 42 from front housing assembly 12 to main circuit board 24.

Rear housing assembly 32 carries a connector panel on its rear surface. The connector panel provides electrical connection to a dual frequency/dual beam sonar transducer and to a battery power cable.

When the components shown in FIG. 1A are assembled, LCD assembly 16 is attached to front housing assembly 12 by screws 20. Spinner assembly 22 is press fit onto the shaft of motor 26, and main circuit board 24 is attached to front housing assembly 12 by screws 38. FIG. 1C shows flasher 10 with all components assembled, except for rear housing assembly 32.

Gasket 14 provides a seal between front housing assembly 12 and rear housing assembly 32 when they are assembled. Screws 34 attach rear housing assembly 32 to front housing assembly 12.

Figure 2A:
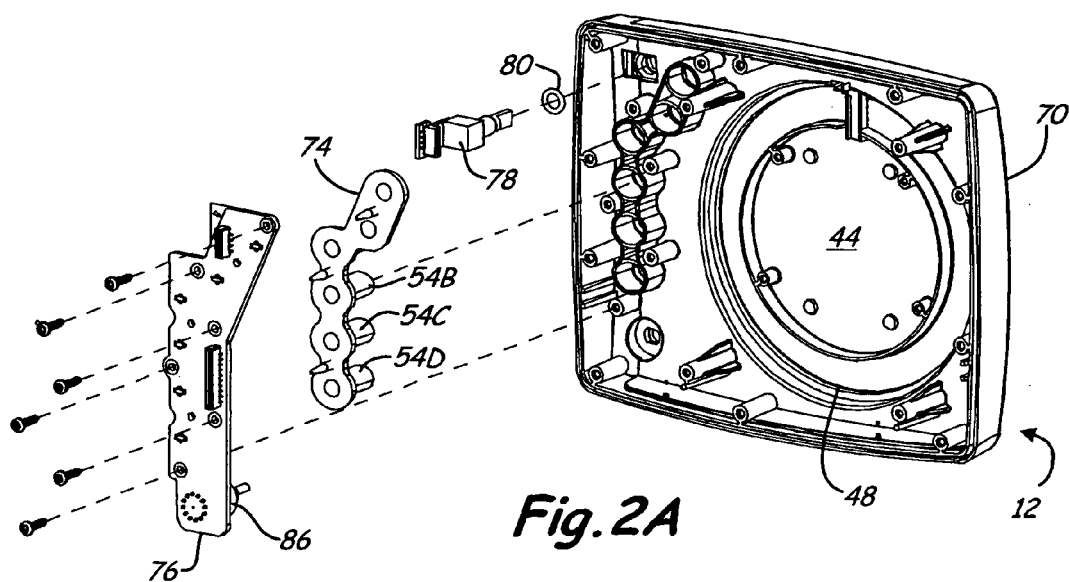
FIG. 2A shows an exploded perspective view from the rear of the front housing assembly of the flasher of FIGS. 1A-1C.
Figure 2B:
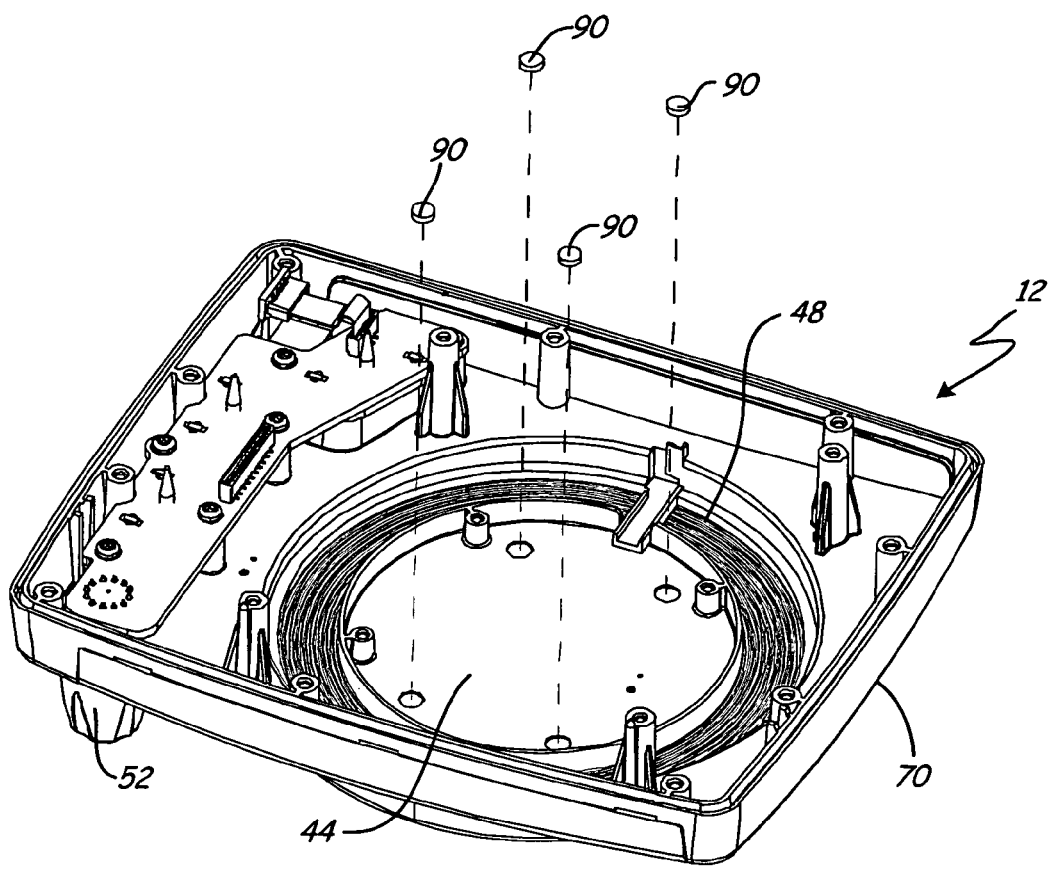
FIG. 2B is a rear perspective view of an assembled front housing assembly, with display support foam pads shown in exploded view.
Figure 2C:
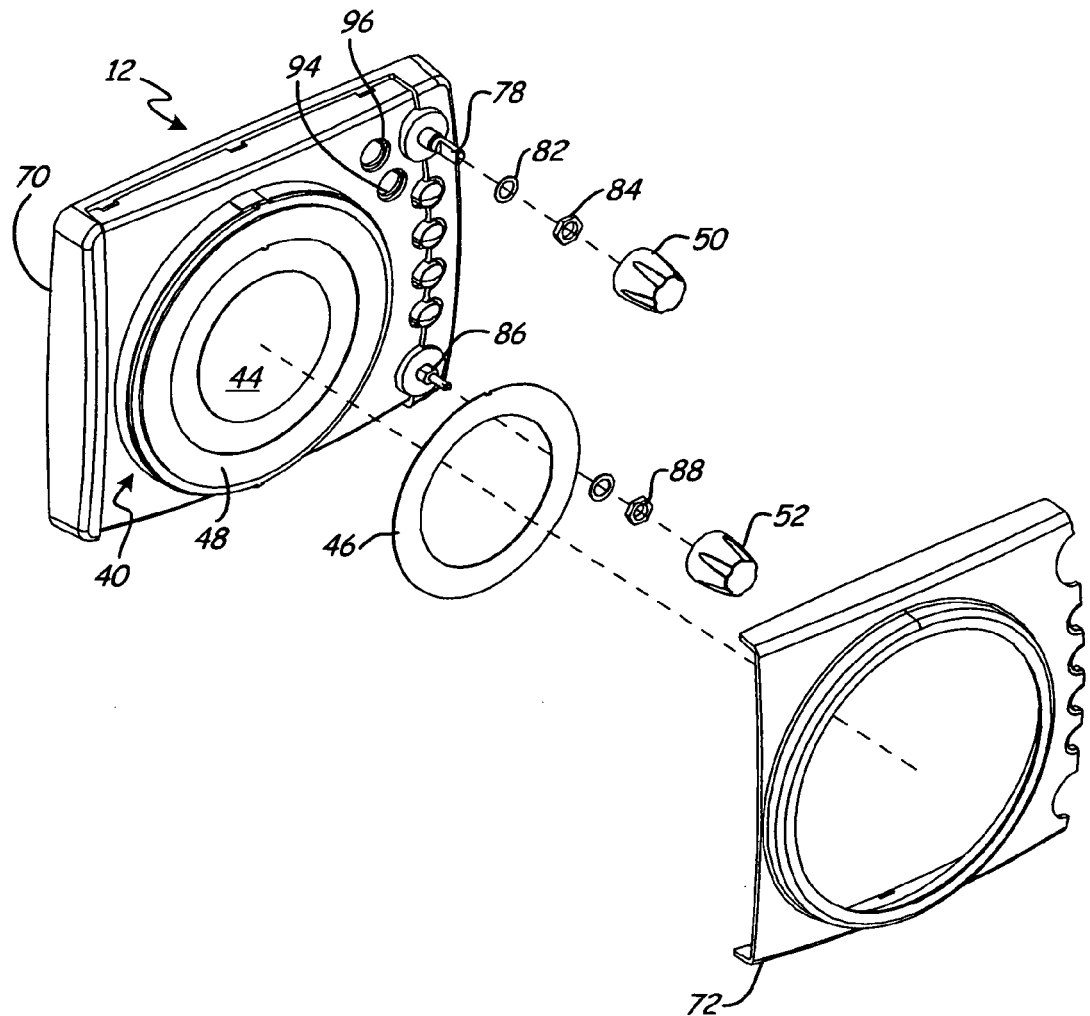
FIG. 2C is an exploded front perspective view of the front housing assembly.

FIGS. 2A-2C show front housing assembly 12. Front housing assembly 12 includes lens overlay ring 46, encoder knob 50, selector knob 52, front housing 70, bezel 72, key pad 74 (including keys 54A-54D), key pad printed circuit board 76, encoder module 78 (with washers 80 and 82 and nut 84), rotary selector switch 86 (and nut 88), display support foam elements 90, and screws 92. As can be seen in FIGS. 2A-2C, front housing 70 includes two additional apertures 94 and 96 for two additional keys. In the embodiment shown in FIGS. 2A-2C, bezel 72 covers apertures 94 and 96, so that only four keys 54A-54D are accessible. In another embodiment, bezel 72 includes apertures with a line with apertures 94 and 96 so that six input keys 54A-54F (shown in FIG. 9A) are available. This allows additional functions to be provided, as will be discussed later in this application.

Figure 3A:
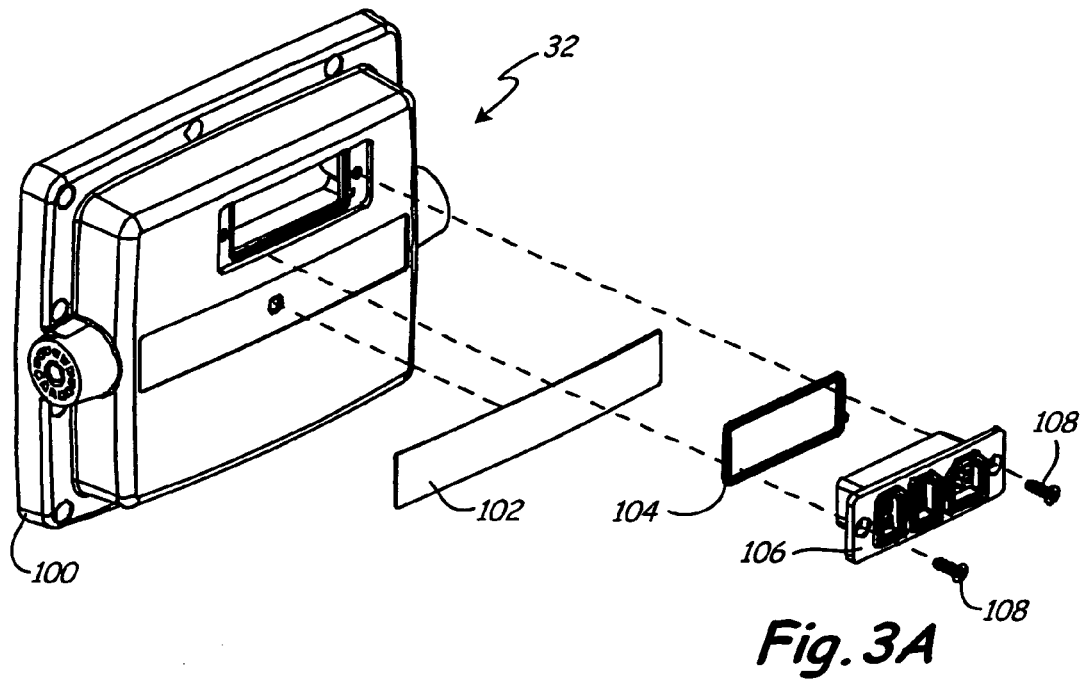
FIG. 3A is an exploded view of the rear housing assembly.
Figure 3B:
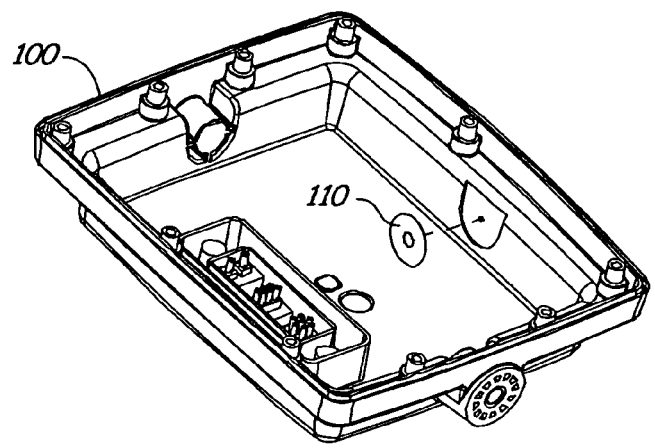
FIG. 3B is a perspective view showing the inside of the rear housing assembly.

FIGS. 3A and 3B show rear housing assembly 32, which includes rear housing 100, label 102, gasket 104, connector panel 106, screws 108, and water tight air vent 110.

Figure 4A:
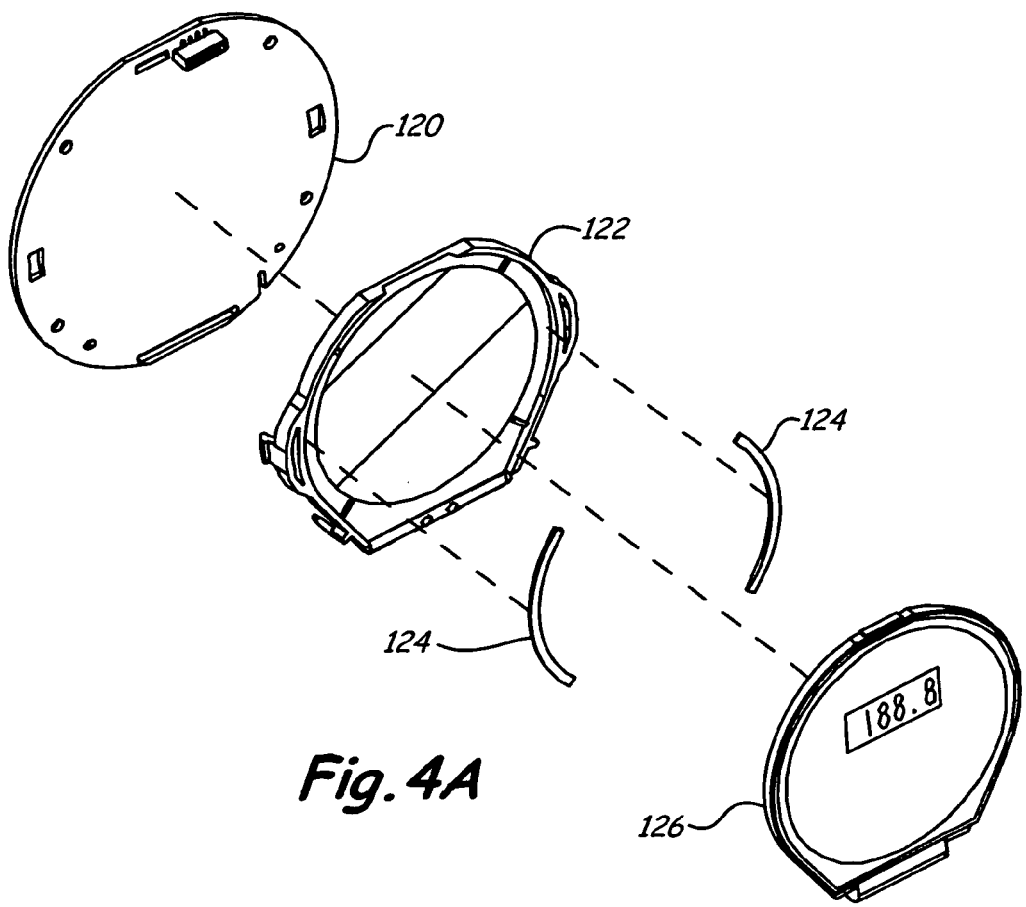
FIG. 4A is an exploded view of the LCD display module.
Figure 4B:
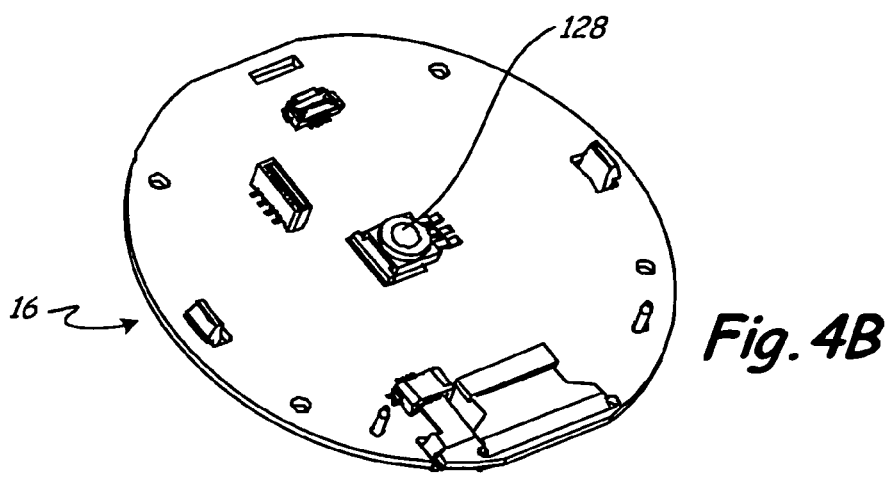
FIG. 4B is a perspective view showing the rear side of the LCD display module.

FIGS. 4A and 4B show LCD module 16, which includes printed circuit board 120, back light assembly 122, LCD support foam 124, and LCD display 126. On the back side of LCD module 16 (as shown in FIG. 4B), multicolor LED light source 128 is mounted so that it will be aligned with the axis of rotation of spinner assembly 22. The LED source 128 includes multiple light emitting diodes for emitting red, green, and blue light. By varying the intensity of red, green, and blue light emitted from the light emitting diodes, a full spectrum of different colors, including white, can be generated.

Figure 5A:
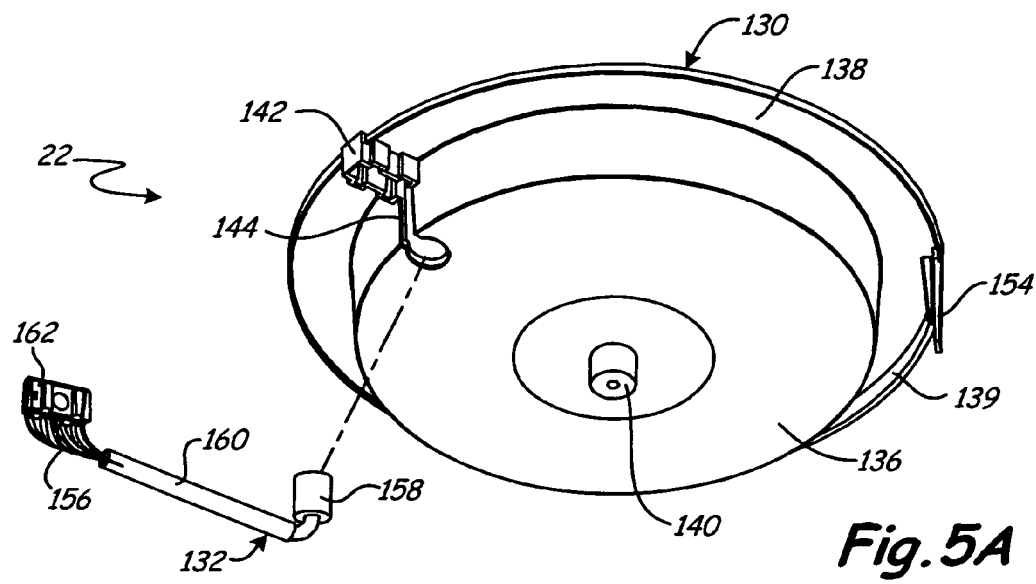
FIG. 5A is an exploded view from the rear of the spinner assembly.
Figure 5B:
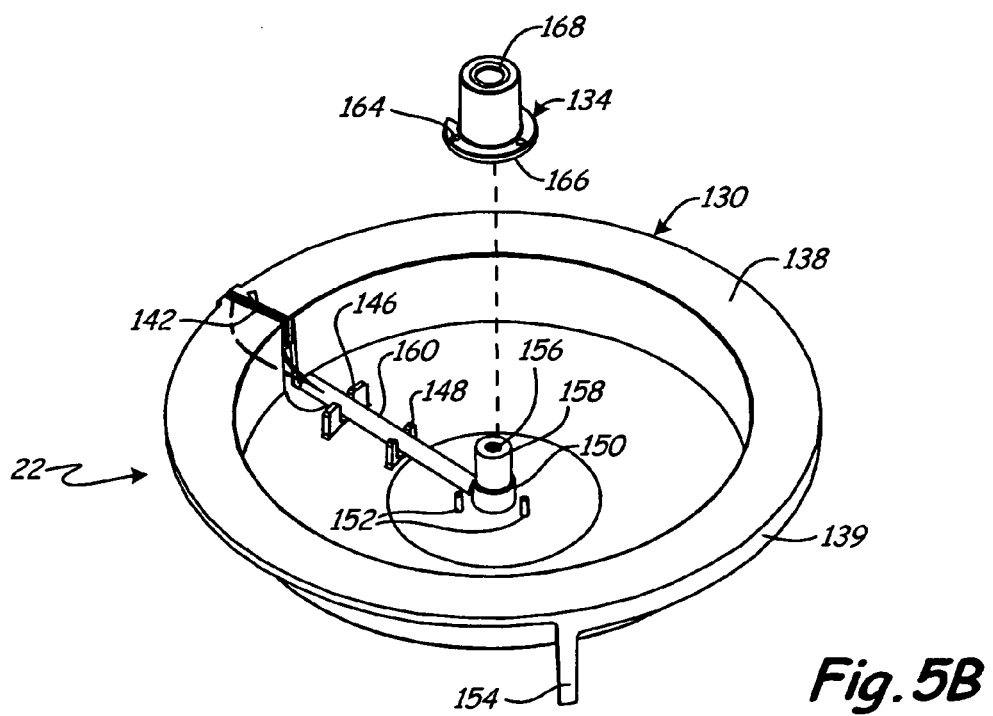
FIG. 5B is an exploded view from the front side of the spinner assembly.

FIGS. 5A and 5B show spinner assembly 22, which includes spinner disc 130, light pipe assembly 132 and light pipe cap 134. Spinner disc 130 includes center cup 136, outer flange 138, counterweight rim 139, hub 140, light output area 142, access slot 144, fiber optic cradles 146 and 148, inlet end holder 150, mounting pins 152, and synchronization interrupter 154.

Light pipe assembly 132 is a light guide that includes a bundle of optical fibers 156, inlet end 158, sleeve 160, and outlet end 162. Optical fibers 156 are arranged in a circular bundle at inlet end 158. They pass as a bundle through sleeve 160, and then are arranged in a fan shaped arrangement in outlet end 162. Inlet end 158 is supported by inlet end holder 150 of spinner disc 130. Cradles 146 and 148 hold sleeve 160 in place. Slot 144 in spinner disc 130 is shaped to allow insertion of inlet end 158 and sleeve 160 into cup 136, while allowing optical fibers 156 to pass from the interior of cup 136 to light output area 142. The male portion of outlet end 162 of light pipe assembly 132 is received in the female portion of light output area 142 on the back side of flange 138. The top surface of flange 138 has a matte finish which is relatively dark and non-reflective. Counterweight rim 139 is attached to flange 138 opposite of light pipe assembly 132 in order to balance spinner disc 130 when spinning.

Light pipe cap 134 fits over inlet end 158 of light pipe assembly 132 and inlet end holder of spinner disc 130. Pins 152 extend through holes 164 in flange 166 of light pipe cap 134. Center aperture 168 of cap 134 is aligned with fibers 156 at inlet end 158 of light pipe assembly 132.

Figure 5C:
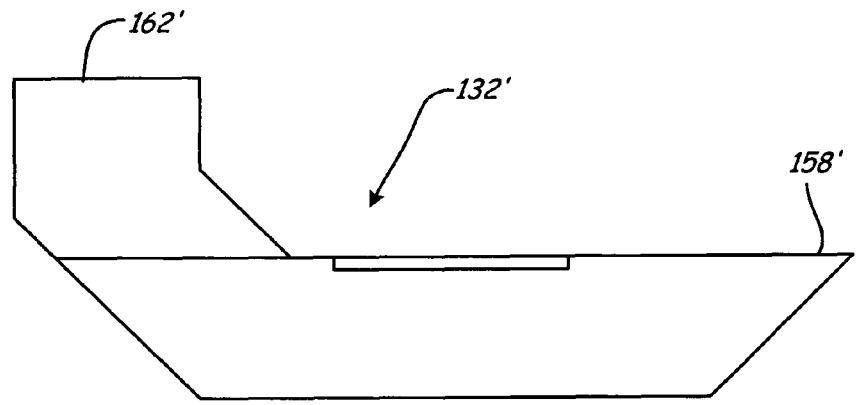
FIG. 5C is a side view of an alternative embodiment of a light guide assembly.
Figure 5D:
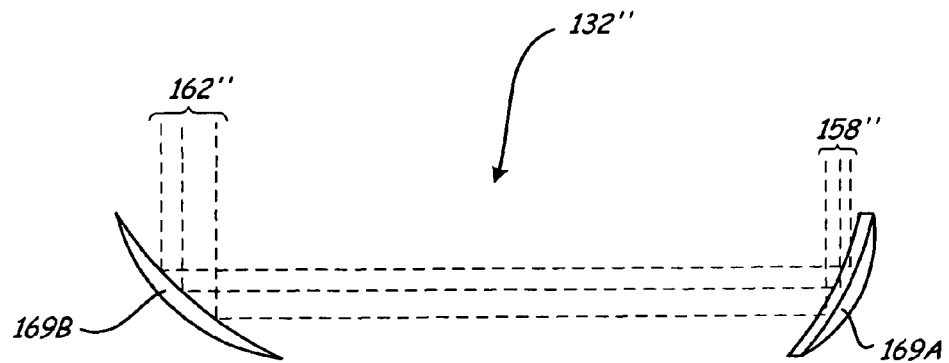
FIG. 5D is a side view of another alternative embodiment of a light guide assembly.

In other embodiments, light pipe assembly 132 could be one of a variety of light guides that can receive light from light source 128 at inlet end 158 and emit it at outlet end 162. FIG. 5C illustrates an alternative embodiment of a light guide assembly. Light guide assembly 132' includes a single element light pipe as opposed to including bundle of optical fibers 156. Light guide assembly 132' functions similarly to light pipe assembly 132 in that light enters at inlet end 158' and is emitted at outlet end 162'. FIG. 5D illustrates another alternative embodiment of a light guide assembly. Light guide assembly 132" includes a series of mirrors 169A and 169B configured to concentrate and reflect light emitted from light source 128. Mirror 169A can be an optically reflective surface configured to gather light at input end 158" from light source 128 and reflect it to mirror 169B. Mirror 169B can be an optically reflective surface configured to receive light from mirror 169A and reflect collimated light out outlet end 162" toward flasher ring lens 48. In still other embodiments, a light guide assembly can be a hybrid that includes a single-element light pipe together with a bundle of optical fibers or a hybrid that includes a curved mirror together with a bundle of optical fibers. In each of these embodiments, the light guide can direct light from the inlet end to an outlet end in a beam.

Figure 6A:
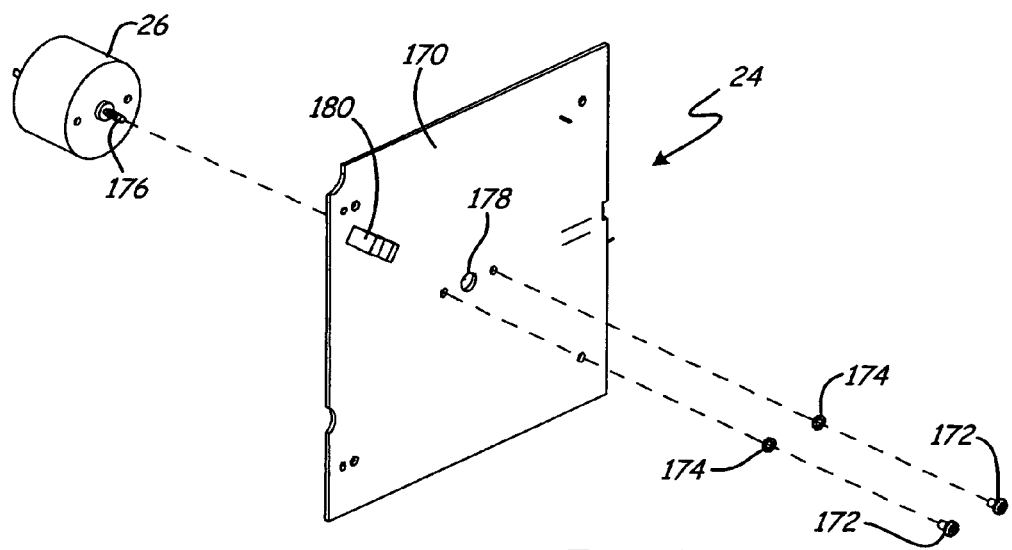
FIG. 6A is an exploded view generally from the front side of the main circuit board and motor assembly.
Figure 6B:
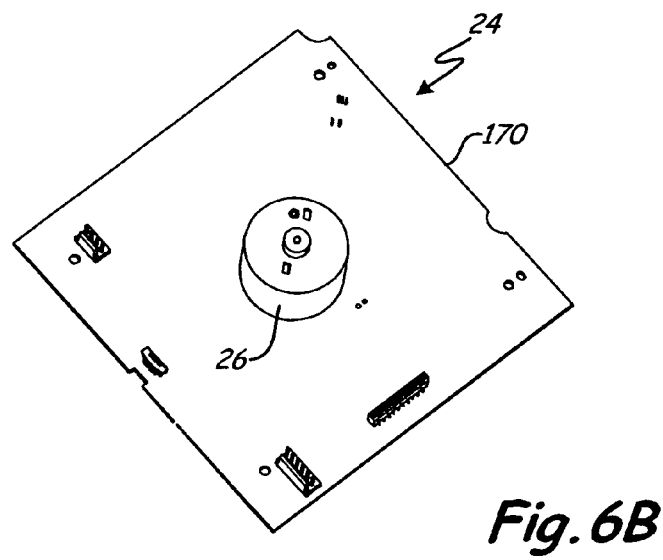
FIG. 6B is a perspective view showing the rear side of the main circuit board and motor assembly.

FIGS. 6A and 6B show main circuit board assembly 24. In these views, individual electronic components mounted on circuit board assembly 24 are not shown. In FIGS. 6A and 6B, motor 26 is mounted on printed circuit board 170. Screws 172 and lock washers 174 attach motor 26 to the back side of circuit board 170. Shaft 176 of motor 26 extends through central aperture 178 in circuit board 170, so that it can be attached to hub 136 of spinner assembly 22.

As shown in FIG. 6A, optical sensor 180 is mounted on the front side of circuit board 170. Optical sensor 180 is a top dead center indicator that is positioned to detect interrupter 154 of spinner assembly 22 each time interrupter 154 passes through optical sensor 180. This causes a synchronization pulse to be generated that is used by the circuitry carried on circuit board 170 to produce the top dead center reference line on the flasher display.

Figure 1C:
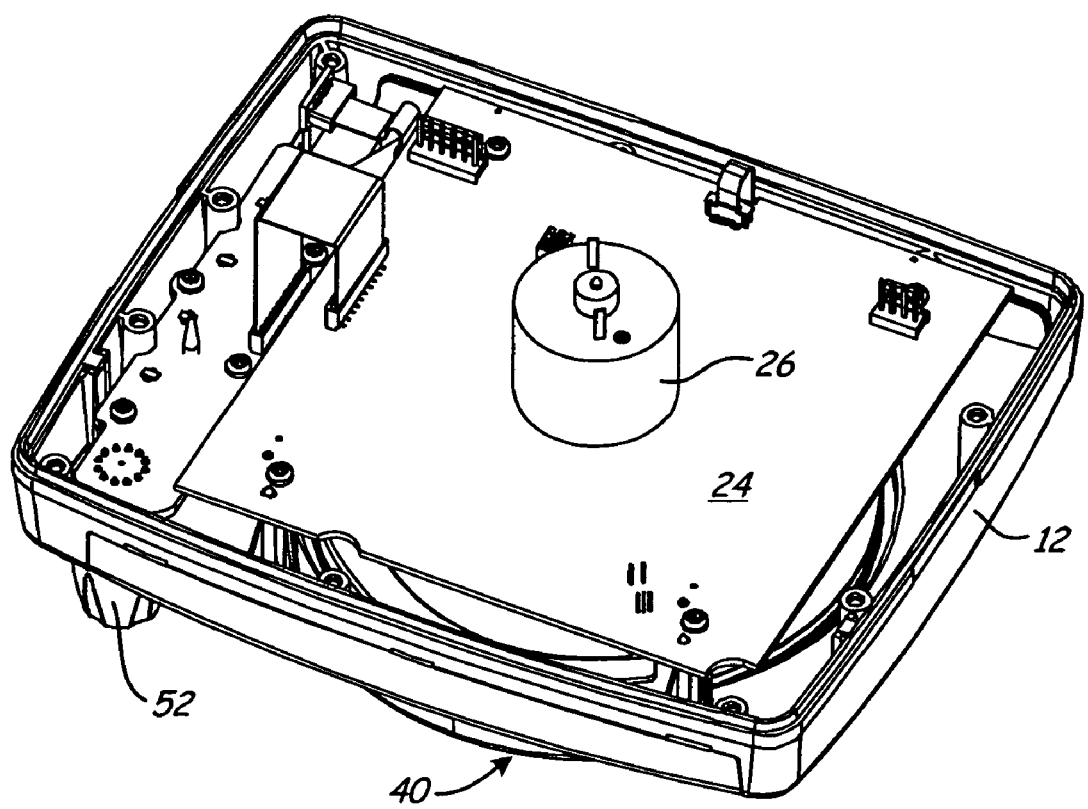
FIG. 1C is a perspective view, from the rear of the sonar device of FIG. 1A with the rear housing assembly removed.
Figure 7:
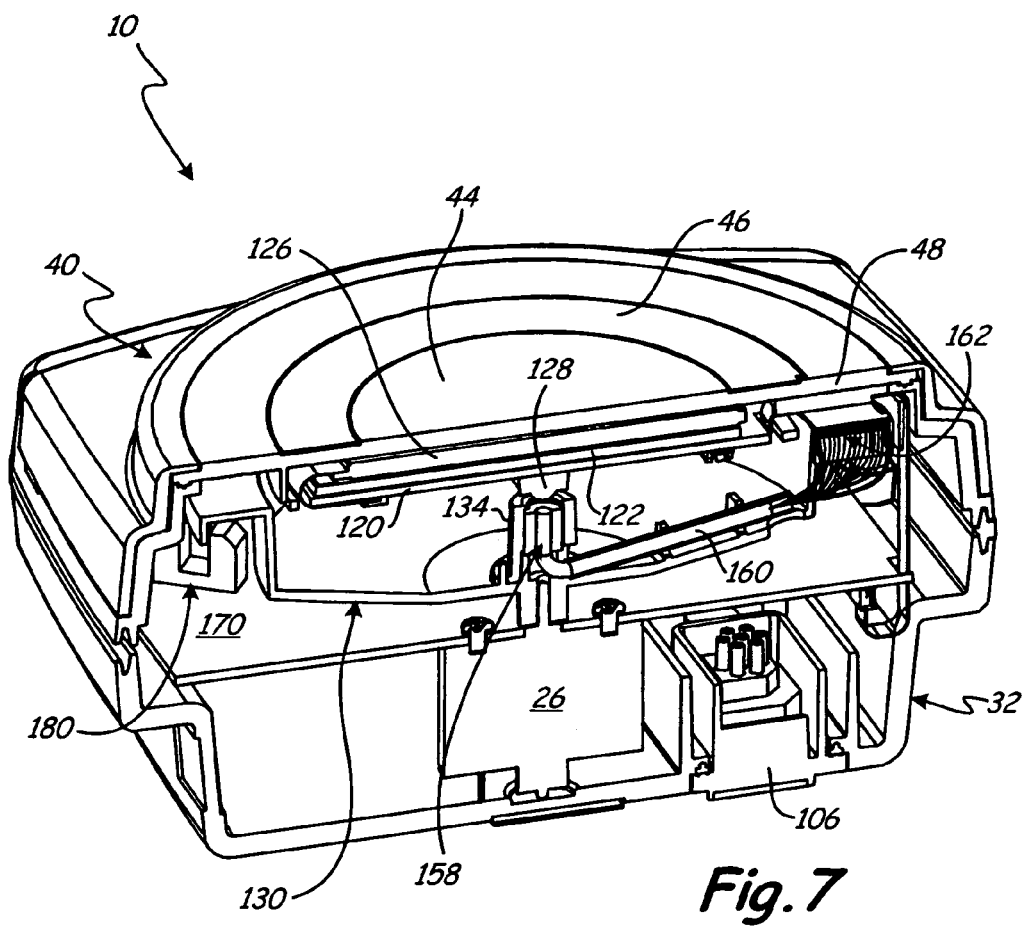
FIG. 7 is a sectional view along section 7-7 of FIG. 1B.

FIG. 7 is a perspective view of flasher fish finder 10, sectioned along section 7-7 of FIG. 1B.

Figure 8:
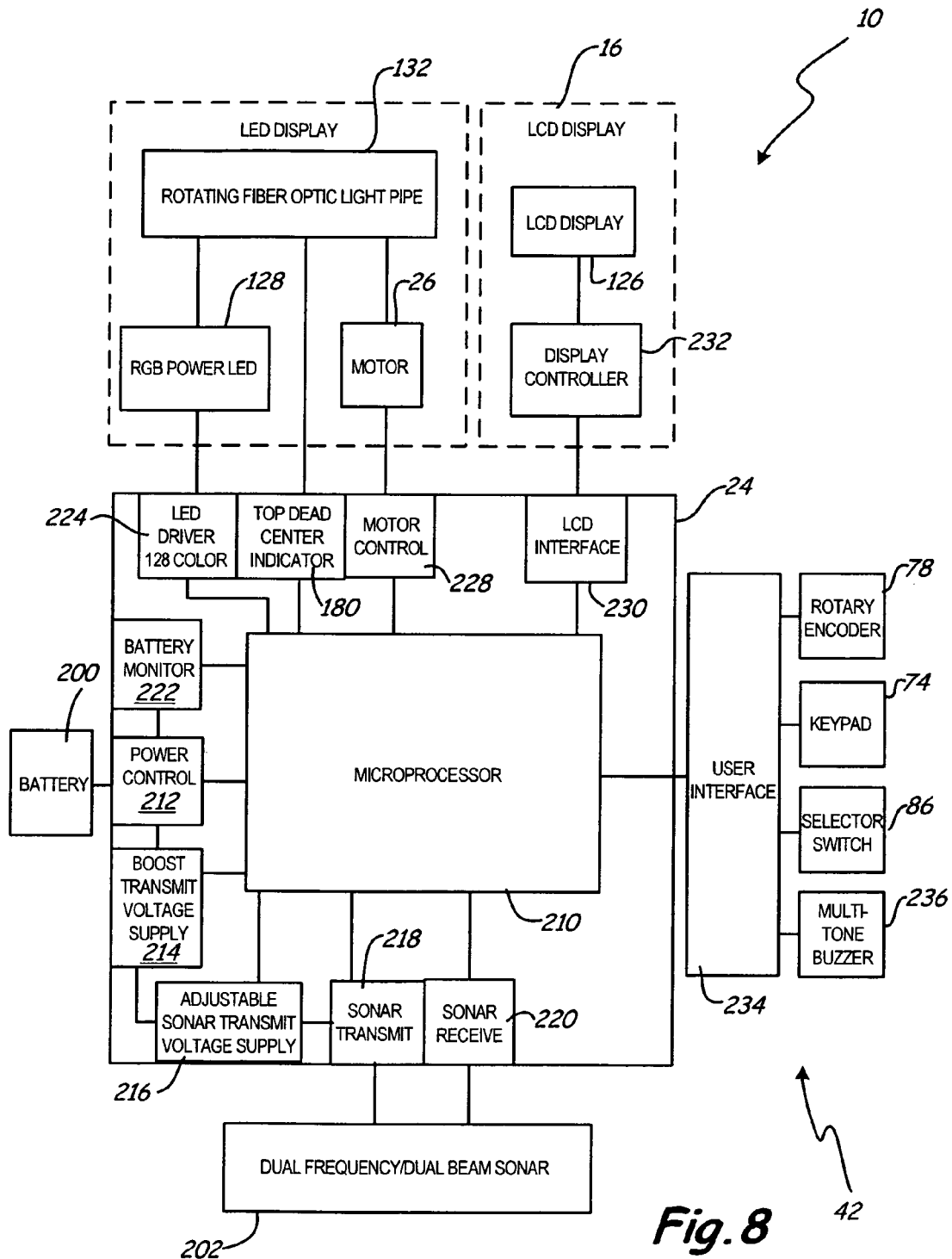
FIG. 8 is a block diagram of the flasher sonar device.

FIG. 8 is a block diagram of flasher fish finder 10. The main components shown in FIG. 8 are LCD module 16, main control board 24, user interface 42, the LED flasher display (formed by motor 26, LED light source 128 and light pipe assembly 132), battery 200, and dual frequency/dual beam sonar 202. Operation of flasher fish finder 10 is coordinated and controlled by microprocessor 210 on main circuit board 24.

Main circuit board 24 also includes power control 212, boost transmit voltage supply 214, adjustable sonar transmit voltage supply 216, sonar transmit circuitry 218, sonar receive circuitry 220, battery monitor 222, LED driver 224, top dead center indicator 180, motor control 228, and LCD interface 230.

LCD module 16 includes LCD display 126 and display controller 232. User interface 42 includes user interface circuitry 234, keypad 74, rotary encoder 78, selector switch 86, and multitone buzzer 236. Flasher display 46 includes spinner assembly 22, motor 26, and LED 64.

Battery 200 provides electrical power to power control 212 on main circuit board 24. Power control 212 turns on and off power to all of the components of flasher 10. It also includes voltage regulation circuitry to provide the voltages required by the logic circuitry of flasher fish finder 10. Boost transmit voltage supply 214 increases the voltage from power control 212 to 30 volts from the battery voltage of 12 volts. The 30 volt output of boost transmit voltage supply 214 is provided to adjustable sonar transmit voltage supply 216, which provides the power to sonar transmit circuitry 218. Microprocessor 12 can control adjustable sonar transmit voltage supply 216 in order to adjust the sonar power used to drive dual frequency/dual beam sonar 202 as a function of water depth.

In one embodiment, sonar transducer 212 is driven at one of two different frequencies: about 240 kHz for a wide beam and about 455 kHz for a narrow beam. The wide beam gives greater lateral coverage, while the narrow beam provides less coverage but higher resolution.

Sonar receive circuitry 212 receives the sonar returns from transducer 202, and provides them to microprocessor 210. Signal processing of the sonar returns, including noise settings and gain settings, can be achieved by adjusting thresholds used by microprocessor 210 in processing the sonar return signals. Microprocessor 210 stores the intensity of sonar return signals in bins based on the time between the sonar transmit pulse and the receipt of the sonar return signal.

Microprocessor 210 controls the flasher display based upon stored sonar returns and the top dead center signal received by top dead center indicator (optical sensor) 180. The top dead center indication (which indicates when interrupter 154 passes through optical sensor 180) allows microprocessor 210 to synchronize the light output of multicolor LED 128 (and therefore the fiber optic light pipe 132) with rotation of spinner assembly 22. Microprocessor 212 provides drive signals to LED 128 through LED driver 224. The color of the light generated by LED 128 is dependent upon the color selected by microprocessor 210 with LED driver 224. In one embodiment, LED 128 is a Harvatek red, green, blue power LED module.

Microprocessor 210 controls the rotation of spinner assembly 22. Motor control signals that are provided by microprocessor 210 to motor control 228, which controls the speed of motor 26.

Microprocessor 210 controls operation of LCD display 126 through LCD interface 220 and display controller 232. Depending upon the inputs microprocessor 210 receives from user interface 42, different information can be displayed on LCD display 126 to provide a number of different display features and other functionality.

Microprocessor 210 receives input signals through interface circuitry 234 from rotary encoder 78, keypad 74, and selector switch 86. Multitone buzzer 236 provides an audio feedback to the user when keys on keypad 74 are pressed. Microprocessor 210 provides signals to multitone buzzer 236 in response to detected key presses on keypad 74.

Battery monitor 222 monitors the power from battery 200 to provide a signal representing the state of charge of battery 200. Upon receiving an input from keypad 74 requesting battery status, microprocessor 210 causes a battery percentage value to be displayed on LCD display 126.

This invention offers several advantages over prior art flasher displays. First, by mounting multicolor LED light source 128 on the back of LCD module 16 as opposed to spinner disc 130, overall weight of spinner disc 130 is reduced. There are, consequently, no leads to run on spinner disc 130. Also, fiber light pipes are relatively low weight. These weight reductions result in less stress on motor 26—and longer battery life since motor 26 requires less power to drive spinner disc 130.

Second, by transmitting light with a light guide, this invention does not require any electrical connection to spinner disc 130 such as a slip ring and brush. There are several advantages to not having a slip ring and brush. With ordinary slip rings and brushes, the lifetime of the brushes and the slip rings becomes shortened by wear where the brushes contact the slip rings during rotation. This results in a change in voltage due to an increased resistance at the connection between the slip ring and the brush, causing a decrease in flasher brightness. By removing the need for slip rings and brushes, the display can continue emitting a relatively bright light as the flasher gets older and the need for repair is reduced. Moreover, flasher ring 48 is not contaminated by carbon generated by the friction of a slip ring and a brush. Additionally, noise generated by the friction between slip ring and brush is also eliminated.

Moreover, ordinary slip rings and brushes require two brushes just to produce a single color, three brushes to produce up to three colors, and four brushes to produce a full spectrum of colors with LEDs mounted on a spinner disc. Actually producing a full spectrum of colors with four brushes greatly increases the amount of noise generated by the brushes. By transmitting light from a stationary LED with a light guide, the full spectrum of colors can be displayed without any brushes and rings.

Third, a light pipe uses total internal reflection to provide a relatively efficient means for transferring light from one point to another. A light pipe can perform this operation with low light loss, transferring at least 50% of light emitted from a light source to the ring lens. Light transfer efficiency can approach 100% by using components such as a curved mirror and/or a fiber optic taper to concentrate the light into the light pipe. This increase in efficiency allows the flasher sonar device to use less power, generate less heat, and provide a brighter display.

Fourth, a light pipe is a relatively low cost part. This design reduces the overall cost to manufacture a flasher sonar device.

Although the present invention has been described with reference to preferred embodiments, workers skilled in the art will recognize that changes may be made in form and detail without departing from the spirit and scope of the invention. For example, the flasher display described above as including a combination of a flasher ring lens and an LCD could instead be a conventional flasher display with a flasher ring lens but without an LCD.

What is claimed is:

1. A flasher sonar device comprising:
   a spinner assembly that includes a light guide;
   a motor for rotating the spinner assembly;
   a stationary light source for supplying light pulses to an inlet end of the light guide, the inlet end of the light guide being movable relative to the light source during operation wherein the light guide directs light from the inlet end to an outlet end in a beam; and
   a controller that drives the light source as a function of sonar returns and angular position of the spinner assembly.

2. The flasher sonar device of claim 1, and further comprising:
   a window in front of the outlet end of the light guide; and
   a scale adjacent to the window.

3. The flasher sonar device of claim 1, wherein the light guide comprises one of a light pipe, a bundle of optical fibers; and a curved mirror.

4. The flasher sonar device of claim 1, wherein the light source comprises:
   a multicolor light source; and
   a light source driver for receiving a flasher signal from the controller and providing the flasher signal to the light source.

5. A flasher sonar device comprising:
   a spinner assembly that includes a light guide;
   a motor for rotating the spinner assembly;
   a light source for supplying light pulses to an inlet end of the light guide, wherein the light guide directs light from the inlet end to an outlet end in a beam; and
   a controller that drives the light source as a function of sonar returns and angular position of the spinner assembly; and
   wherein the spinner assembly comprises:
      a center cup;
      an outer flange connected to the center cup; and
      a light output area for receiving the outlet end of the light guide.

6. The flasher sonar device of claim 5, wherein the spinner assembly further comprises:
   an access slot shaped to allow insertion of the inlet end of the light guide into the center cup;
   a cradle for holding the light guide in place; and
   an inlet end holder for holding the inlet end aligned with a center aperture of a light guide cap.

7. A flasher sonar device comprising:
   a stationary light source;
   an annular window;
   a light guide having an inlet end aligned with the light source and an outlet end aligned with the annular window, the inlet end being moveable relative to the light source during operation;
   a motor for rotating the light guide; and
   a controller for causing the light source to generate light signals based upon sonar depth information and angular position of the light guide so that light from the light source is emitted into the inlet end of the light guide, wherein the light guide directs light from the inlet end to the outlet end in a beam.

8. A sonar device comprising:
   a stationary light source;
   a rotatable element;
   a motor for rotating the rotatable element;
   a display; and
   a light guide mounted on the rotatable element and having an inlet end aligned with the light source and an outlet end aligned with the display, so that light emitted from the light source enters the inlet end of the light guide, is directed from the inlet end to the outlet end in a beam, and is emitted out the outlet end of the light guide, the inlet end of the light guide being moveable relative to the stationary light source during operation.

9. The sonar device of claim 8, wherein the light guide comprises a bundle of optical fibers.

10. A sonar device comprising:
    a light source;
    a rotatable element;
    a motor for rotating the rotatable element;
    a display;
    a light guide mounted on the rotatable element and having an inlet end aligned with the light source and an outlet end aligned with the display, so that light emitted from the light source enters the inlet end of the light guide, is directed from the inlet end to the outlet end in a beam, and is emitted out the outlet end of the light guide;
    wherein the light guide comprises a bundle of optical fibers; and
    wherein the light guide includes:
       a sleeve that surrounds the bundle of optical fibers;
       an inlet end fitting that holds the bundle of optical fibers in a circular shape at the inlet end;
       a light guide cap that fits over the inlet end fitting; and
       an outlet end fitting that holds the bundle of optical fibers in a fan shaped arrangement at the outlet end.

11. A flasher sonar device comprising:
    a sonar circuit;
    a motor;
    a rotatable element for rotation about an axis by the motor;
    a light guide attached to the rotatable element and having an inlet end aligned with the axis and an outlet end spaced radially outward from the axis; and
    a stationary light source for supplying light to the inlet end of the light guide based upon flasher signals from the sonar circuit; the inlet end of the light guide being moveable relative to the light source as the rotatable element rotates about the axis during operation.

12. The flasher sonar device of claim 11, wherein the sonar circuit comprises:
    a sonar transducer;
    a sonar transmitter for driving the sonar transducer to generate sonar pulses;
    a sonar receiver for receiving sonar returns from the sonar transducer; and
    a controller for storing signal intensities of the sonar returns and providing flasher signals to the light source based upon the stored signal intensities in synchronization with rotation of the rotatable element.

13. The flasher sonar device of claim 12, wherein the light source comprises:
    a multicolor LED source; and an LED driver for receiving flasher signals from the controller and providing drive signals to the light source based upon the flasher signals.

14. The flasher sonar device of claim 11, wherein the light guide comprises a bundle of optical fibers.

15. The flasher sonar device of claim 14, wherein the light guide includes a sleeve that surrounds the bundle of optical fibers.

16. The flasher sonar device of claim 14, wherein the light guide includes an inlet end fitting that holds the bundle of optical fibers in a circular shape at the inlet end.

17. A flasher sonar device comprising:
a sonar circuit;
a motor;
a rotatable element for rotation about an axis by the motor;
a light guide attached to the rotatable element and having an inlet end aligned with the axis and an outlet end spaced radially outward from the axis;
a light source for supplying light to the inlet end of the light guide based upon flasher signals from the sonar circuit;
wherein the light guide comprises a bundle of optical fibers;
wherein the light guide includes an inlet end fitting that holds the bundle of optical fibers in a circular shape at the inlet end; and
a light guide cap that fits over the inlet end fitting.

18. A flasher sonar device comprising:
a sonar circuit;
a motor;
a rotatable element for rotation about an axis by the motor;
a light guide attached to the rotatable element and having an inlet end aligned with the axis and an outlet end spaced radially outward from the axis;
a light source for supplying light to the inlet end of the light guide based upon flasher signals from the sonar circuit;
wherein the light guide comprises a bundle of optical fibers; and
wherein the light guide includes an outlet end fitting that holds the bundle of optical fibers in a radially extending column at the outlet end.

19. The flasher sonar device of claim 11, and further comprising:
a synchronization interrupter carried by the rotatable element; and
a sensor that generates a synchronization pulse when the synchronization interrupter passes the sensor.

20. The flasher sonar device of claim 11, and further comprising:
an annular window wherein the outlet end of the light guide is aligned with the annular window and rotates in a circle behind the annular window.

* * * * *